United States Patent

Vu Khac et al.

[11] Patent Number: 5,544,942
[45] Date of Patent: Aug. 13, 1996

[54] MOTOR VEHICLE SEAT PADDING

[75] Inventors: Tham Vu Khac, Etampes; Michel Sabin, Vineuil; Thierry Guerinot, Etampes, all of France

[73] Assignee: Bertrand Faure Automobile "BFA", Massy Cedex, France

[21] Appl. No.: 266,551

[22] Filed: Jun. 28, 1994

[30] Foreign Application Priority Data

Jun. 29, 1993 [FR] France .................... 93 07926

[51] Int. Cl.⁶ ........................................ A47C 7/18
[52] U.S. Cl. ........................... 297/452.37; 297/DIG. 1; 297/452.27; 297/452.61
[58] Field of Search ............... 297/DIG. 1, 452.27, 297/452.37, 452.61, 218.2; 5/464

[56] References Cited

U.S. PATENT DOCUMENTS

| 3,828,378 | 8/1974 | Flam | 5/464 |
| 4,699,427 | 10/1987 | Kobayashi | 297/452.27 X |
| 4,747,638 | 5/1988 | Saito | 297/DIG. 1 X |
| 4,784,437 | 11/1988 | Shimada | 297/452.27 X |
| 4,813,738 | 3/1989 | Ito | 297/452.27 X |
| 4,819,287 | 4/1989 | Halverson | 5/464 X |
| 4,865,379 | 9/1989 | Aoki et al. | 297/452.27 X |
| 4,883,318 | 11/1989 | Adachi | 297/DIG. 1 X |
| 5,000,515 | 3/1991 | Deview | 297/DIG. 1 X |
| 5,252,278 | 10/1993 | Spann et al. | 5/464 X |

FOREIGN PATENT DOCUMENTS

| 11755 | 6/1980 | European Pat. Off. | 5/464 |
| 0157105 | 10/1985 | European Pat. Off. | |
| 2837608 | 3/1980 | Germany | 297/452.37 |
| 3521068 | 12/1985 | Germany | |
| 3000029 | 1/1993 | WIPO | 297/452.27 |

Primary Examiner—Peter M. Cuomo
Assistant Examiner—David E. Allred
Attorney, Agent, or Firm—Larson and Taylor

[57] ABSTRACT

A seat padding, in particular for a motor vehicle seat backrest, includes a foam block whose support face has a recess closed by a base towards the opposite face, and filled with an insert of material permeable to air and/or moisture. The recess is arranged between two lining return grooves defining two re-entrant lines in the cover surrounding the padding and symmetrical with respect to the vertical midplane of the padding. The recess is separated from the grooves by two respective shoulders made of a hard foam.

10 Claims, 2 Drawing Sheets

U.S. Patent
Aug. 13, 1996
5,544,942
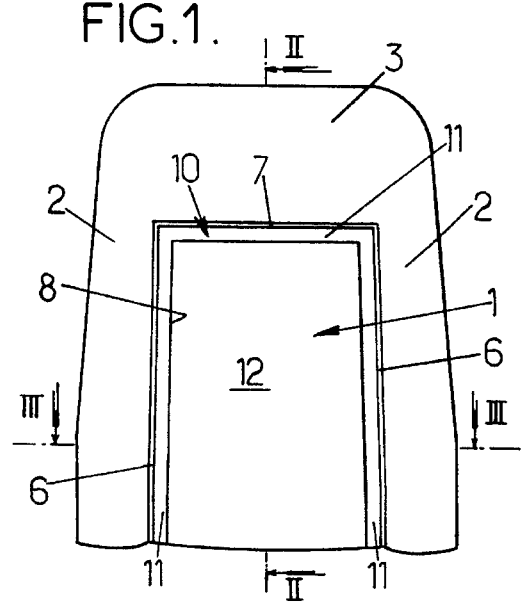
FIG.1.
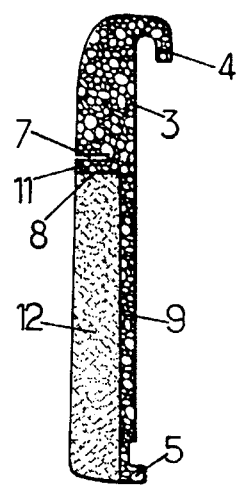
FIG.2.
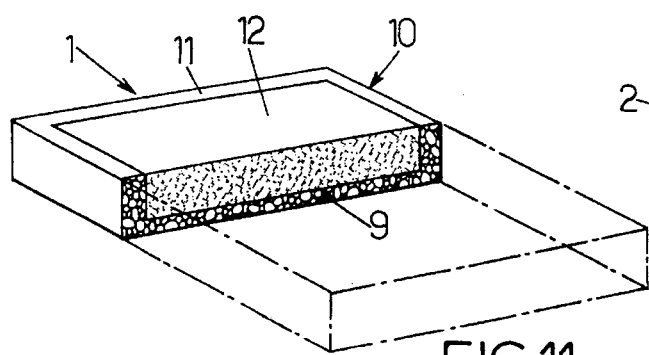
FIG.4. FIG.11.
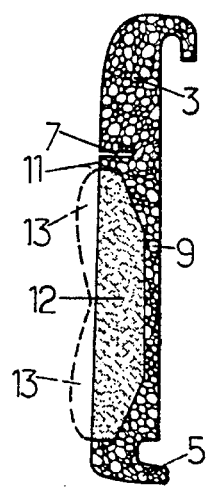
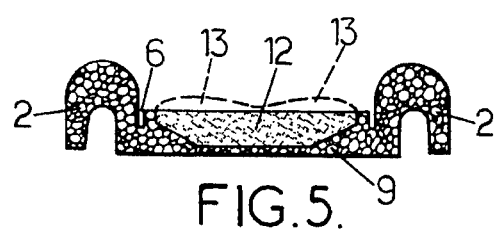
FIG.3.
FIG.5.
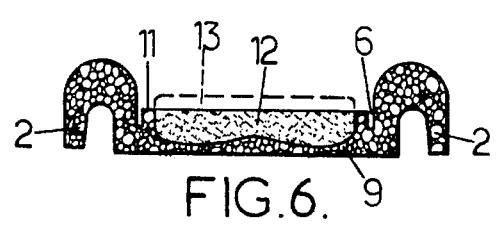
FIG.6.

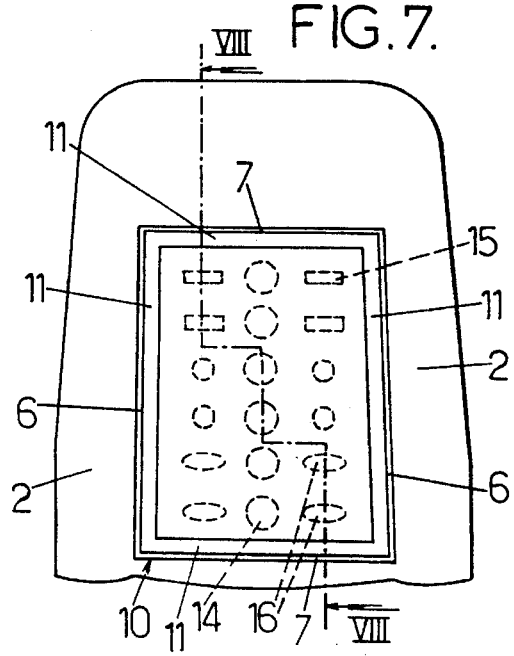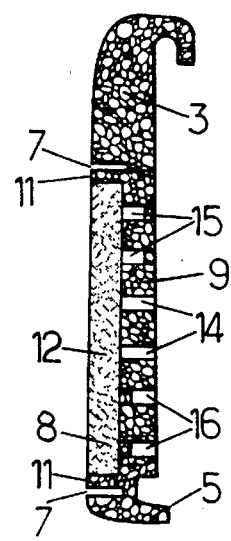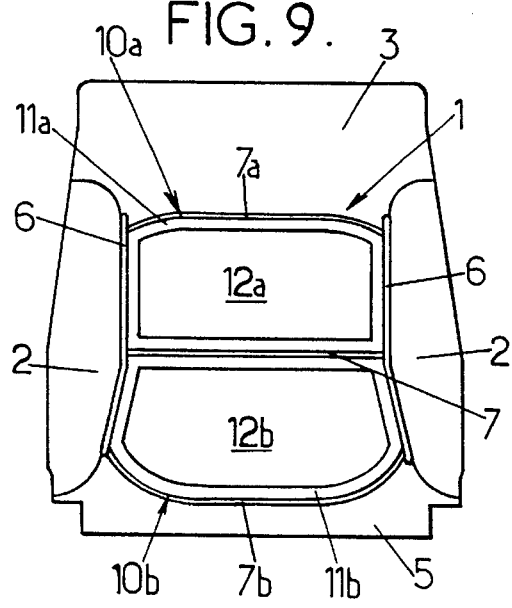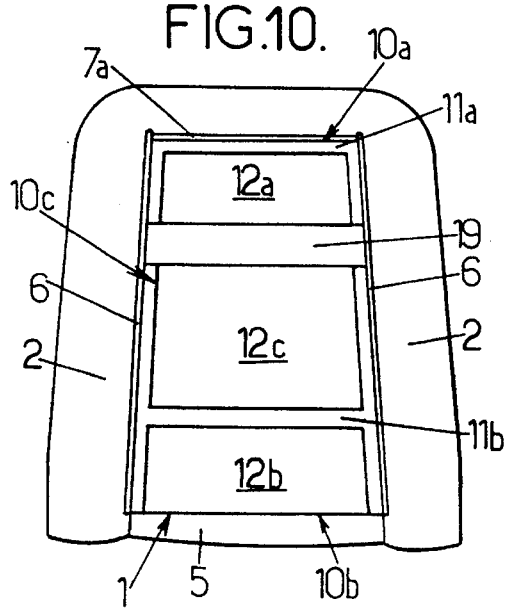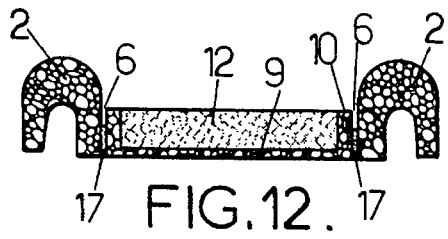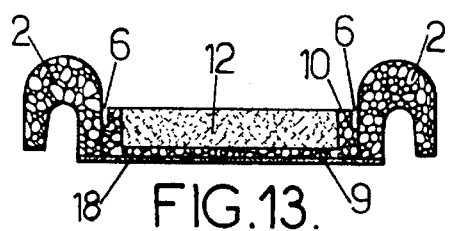

MOTOR VEHICLE SEAT PADDING

The invention relates to seat padding, especially, but not exclusively, for motor vehicles, and relates to padding for cushions, in particular of backrests but also for chair seats, especially for the front seats of motor vehicles.

These seat cushions consist of padding, formed in general by one or more blocks of elastically deformable foam, and a lining called a cover, made of fabric, leather, imitation leather or other suitable material, which covers this or these blocks.

From Patent document DE 1,430,902, a motor vehicle seat padding is known, comprising a foam block having, recessed in its support or bearing face, a recess closed by a base boards the opposite face of the padding, the said recess being filled with an insert consisting of a material which is more permeable to air and/or moisture than the foam constituting the block.

By virtue of the permeable insert, such padding provides good moisture-related and thermal comfort, and benefits from good ventilation and the removal of moisture through emergent openings made in the base of the recess.

On the other hand, padding according to this German document has the drawbacks that its insert is uncomfortable to touch because the permeable material used is an animal or vegetable hair, and especially that it does not make it possible to return the cover between the insert and the foam. This known padding does not therefore have the shapes or structure suited to return of the lining, as is the case of conventional padding made entirely of foam.

In fact, on the latter it is normal to make lining return grooves in the foam, opening in the support face of the block of foam and bounding the central part of the cushion with respect to the side parts, to form re-entrant lines of the cover.

These re-entrant lines are necessary both for giving a concave general shape to the support face of the cushion and for correctly stretching the cover which covers this face, this cover being stretched along the re-entrant lines towards the inside of the cushion. The tension in the cover towards the inside of the padding is provided by known means such as, for example, clips fastened to the cover which are hooked onto wires or rods embedded in the base of the return grooves.

The main object of the invention is to provide padding fitted with an insert providing good moisture-related and thermal comfort and good feel whilst giving the lining returns a quality at least equal to that of the lining returns of padding made entirely from polyurethane foam.

For this purpose, the seat padding according to the invention, of the type known by DE 1,430,902 and as presented hereinabove, is characterized in that, with the support face comprising at least two lining return grooves capable of defining two re-entrant lines in the cover surrounding the padding, which lines are symmetrical or substantially symmetrical to each other with respect to a longitudinal vertical mid-plane of the padding, the recess is arranged between these two grooves and separated from them by two respective narrow shoulders or partitions made of a hard foam.

Under these conditions, the hardness of the foam of the shoulders adjacent to the return grooves makes it possible to give these foam shoulders sufficient rigidity to facilitate fitting of the lining and, despite the presence of one or more permeable inserts, to provide shapes with excellent quality as regards returns of the cover in re-entrant lines along these return grooves.

In preferred embodiments, one and/or another of the following arrangements is additionally employed:

- a third shoulder transversely joins the two shoulders so as to form with them an open U-shaped frame, and a third return groove is adjacent to the frame, outside the latter, along the third shoulder which is also made of hard foam,
- the two shoulders belong to one and the same closed frame which is adjacent to another return groove outside the frame and along at least another part of the frame which is also made of hard foam,
- the padding comprises several transverse recesses filled with inserts and each extending between the two return grooves,
- at least one insert and/or, as known per se by DE 1,430,902, the base of the corresponding recess has a variable thickness in at least one transverse or longitudinal direction of the padding,
- at least one insert has, at least locally, an overthickness of the permeable material, which projects over the support face of the padding with respect to the above shoulders, before lining the padding with a cover,
- the base of at least one recess has at least one blind opening, opening towards the contact face or towards the opposite face of the padding, and/or, as known per se by DE 1,430,902, at least one opening emerging in these two faces,
- the base of at least one recess and/or two side parts of the block of foam which are separated from the two shoulders by the two return grooves are made of a foam substantially as hard as that of the shoulders, which facilitates production of the foam support of at least one insert and/or further improves the quality of the shapes as regards the returns, as well as good holding by the side parts,
- the permeable material constituting at least one insert comprises animal or vegetable fibres, as known by DE 1,430,902, but these fibres are joined together by a synthetic or natural rubber-like binder, which improves the comfortable feel and the flexibility of the padding part filling with the insert,
- as a variant, the permeable material constituting at least one insert comprises synthetic fibres, such as polyester fibres, forming a wad or joined together either by a polyurethane coating or by fusing a category of fibres constituting the wad, or alternatively balls of synthetic material, for example polyester, joined together by thermoforming,
- at least one insert is prefabricated, for example by thermoforming, and added on and fastened in the corresponding recess made in a block of foam moulded in a single piece including the shoulders,
- as a variant, at least one insert, the base of the corresponding recess and the corresponding shoulders constitute a panel added on in the block of foam and fastened with this block,
- as a further variant, at least one insert is overmoulded in the corresponding recess of a block of foam with variable density moulded in a single piece.

The invention comprises, apart from these main arrangements, certain other arrangements which are preferably used at the same time and which will be dealt with more fully hereinbelow.

In the rest of the description, a description will be given of preferred embodiments of the invention, with reference to the attached drawings, obviously without limitation. In these drawings:

FIG. 1 is a diagrammatic front view of padding for a backrest cushion with an insert of permeable material mounted as a panel in a frame which is not added on and has three sides, FIGS. 2 and 3 are views respectively in longitudinal section, along II—II, and in cross-section, along III—III in FIG. 1, FIG. 4 is a similar section to FIG. 2 of an alternative panel form, FIGS. 5 and 6 are similar sections to FIG. 3, showing other alternative panel forms, FIGS. 7 and 8 are similar views to FIGS. 1 and 2 (FIG. 8 corresponding to a section along VIII—VIII in FIG. 7), showing a frame which is not added on and is closed on four sides, and an alternative block of foam with blind and emergent openings in the base of the recess of the panel, FIGS. 9 and 10 are similar views to FIG. 7, with padding alternatives with respect to two and three panels with closed or U-shaped or H-shaped frame, with various shapes, dimensions and positions, FIG. 11 is a perspective and sectional view of a prefabricated panel with three or four sides, to be added on and fixed on a block of foam for padding, and FIGS. 12 and 13 are similar sections to FIG. 3, diagrammatically representing two modes for fixing the prefabricated panel of FIG. 11 on the block of foam of the other parts of the padding.

In the figures, the similar elements of the various padding examples are labelled by the same reference numbers, optionally assigned an index letter in the case of a plurality of these similar elements.

The padding of FIGS. 1 to 3 comprises a central part 1 intended to be in contact with the user's back and surrounded by peripheral parts comprising two wings or side parts 2 and a backrest top 3, with its cross return 4. At the bottom, as seen in FIG. 2, the central part 1 is also bordered by a lower strip 5 extending at the rear of the padding, between the wings 2.

The central part 1 is bounded with respect to the wings 2 and the top of the backrest 3, respectively by two side lining return grooves 6 and one transverse return groove 7 which connects the grooves 6 at their upper ends.

The wings 2, with a gull-wing cross-section, are, like the two grooves 6, symmetrical or substantially symmetrical with each other with respect to the vertical longitudinal mid-plane of the padding, which corresponds to the section plane II—II.

The return grooves 6 and 7 in the support face of the padding are intended to define re-entrant lines in a cover surrounding the padding. In this example, the grooves 6 and 7 are substantially straight, the groove 7 being substantially horizontal and the grooves 6 substantially vertical or slightly inclined towards each other and towards the top of the backrest 3.

In the volume bounded between the three grooves 6 and 7, forming an inverted U in this example, the central part has a recess 8 which is open towards the bearing face of the backrest against the user's back but closed towards the opposite face by a base 9, and bounded by an open frame 10 with three sides in the form of relatively narrow shoulders or partitions 11 each directly adjacent to one of the three grooves 6 and 7 respectively.

In this example, the wings 2, the top of the backrest 3, the strip 5 as well as the base 9 and the frame 10 consist of a single block of polyurethane foam, the hardness of the polyurethane foam of the base 9 and of the frame 10 being equal to or greater than that of the foam of the other parts.

The recess 8 accommodates an insert 12 made of a material providing better characteristics of air and moisture permeability than the foam of the block.

This permeable insert 12, in contact with the user's back only via the cover part covering this bearing face of the central part 1 of the padding, provides the user with good moisture-related and thermal comfort, reducing if not eliminating the discomfort of dorsal sweating by contact and rubbing against the cushion of the backrest.

In order to adjust at will one and/or other, or even all, of the three parameters comprising the permeability of the padding, flexibility on touch and the hardness of the central part 1, as well as the weight and the thickness of the padding, it is possible to adjust the ratio between the thicknesses of the permeable material of the insert 12 and of the foam of the base 9, on the one hand, in the longitudinal direction, as represented in FIG. 4 and, on the other hand, in the transverse direction, as represented in FIGS. 5 and 6. Furthermore, the thickness of the central part 1, that is to say the sum of the thicknesses of the insert 12 and of the base 9, may be variable in one and/or other of the two longitudinal and transverse directions. It is clear that one and/or other of the two layers of the central part 1 constituted by the insert 12 and the base 9 may have constant or variable thickness in the two aforementioned directions.

In FIG. 4, the thickness of the base 9 is constant in the central part of this base and increases progressively in its upper and lower parts, in which the thickness of the insert 12 commensurately decreases. The section in FIG. 5 shows that the thickness of the base also increases progressively in its side parts, where the thickness of the insert 12 decreases correspondingly. The variant in FIG. 6 shows that the base 9 of the recess may be corrugated and have two side dips separated by a central bulge.

FIGS. 4 to 6 represent, in broken lines, overthicknesses 13 of permeable material which may be provided locally projecting over the support face of the block of foam with respect to the shoulders 11 of the frame 10, before fitting the cover, and which are compressed during the lining of the padding with the cover, so as to return the bearing face of the insert 12 substantially into the plane of the upper faces of the shoulders 11 of the frame. This compression, of at least one localized overthickness of permeable material, makes it possible to adjust the hardness of the insert 12 and its shape, both at the centre and at the edges.

In order to improve and adjust at will the permeability of the central part 1 and adjust at will the flexibility or rigidity of this part, openings may be made in the base 9 of the recess, as represented in FIGS. 7 and 8, where the frame 10 includes four sides 11 and two transverse grooves 7 in addition to the two vertical grooves 6. These openings may comprise openings 14 emerging on the two faces of the base 9, or blind openings, such as 15, which open in the recess 8 towards the insert 12 or, such as 16, open in the opposite or rear face of the base 9. The cross-section of these openings may, for example be circular, rectangular or oval, as represented for the openings 14, 15 and 16 respectively. Other shapes are possible and the number of openings is not limited. Their size, which is also variable, also makes it possible to vary the rigidity. The emergent openings 14 allow good passage of air through the padding. The openings may be distributed in various ways in the base 9, for example arranged in openings centred on vertical or horizontal and parallel lines, or alternatively in a zigzag.

Various shapes may be given to the central part 1 and in particular to its surface covered by one or more permeable inserts. The geometrical shape of the central part 1 is arbitrary, for example a polygonal shape with optionally rounded vertices, and optionally with one or more rounded sides, of convex or concave shape. The contour of the central region 1 may also be rounded or a combination of the aforementioned shapes. The permeable material may cover all the central part or only a portion thereof. Its shapes, dimensions and positions on the central part are chosen freely, especially the width and the height of the panel consisting of the insert 12 and its frame 10, as well as the distance optionally separating the bottom part of this frame from the lower edge of the strip, corresponding to the lower edge of the backrest.

FIGS. 9 and 10 represent padding in which the central part comprises, respectively, two and three transverse recesses filled with inserts, each surrounded by a frame which is closed or open in a U-shape or in an H-shape, and each extending between the two side return grooves.

In FIG. 9, the two side grooves 6 are parallel and vertical in their upper part and move away from one another and towards the strip 5 in their lower part, thus following the inner contour of the wings 2. Between these grooves 6, the central part 1 comprises two panels which are separated from one another only by a transverse return groove 7, and each consists of a permeable insert 12a or 12b housed in one of the two transverse recesses respectively and surrounded by one of the two closed frames 10a and 10b respectively, the side shoulders of which are directly adjacent to the upper and lower parts, respectively, of the grooves 6. The upper frame 10a has a substantially rectangular shape with its upper shoulder 11a rounded in its side parts which join with the straight side shoulders, whilst its lower shoulder, which is also straight, is separated by the groove 7 from the upper straight shoulder of the lower frame 10b. The latter has a substantially trapezoidal shape, with a lower shoulder 11b, corresponding to its large base, which is rounded and convex.

The upper shoulder 11a and the lower shoulder 11b are adjacent respectively to an upper 7a and lower 7b transverse return groove external to the corresponding frame 10a or 10b and joining the upper and lower ends, respectively, of the side grooves 6. In this case, the shoulders 11a and 11b are made of a hard foam, as are the other sides of the closed frames 10a and 10b.

In FIG. 10, the central part 1 comprises three transverse panels which are not adjacent, of rectangular shape, extending between the straight side grooves 6 and are formed by upper 10a, lower 10b and central 10c frames surrounding the respective inserts 12a, 12b and 12c, which may consist of different permeable materials and are housed in recesses with corresponding shapes, dimensions and positions, made in the block of foam. The three frames have substantially the same width, the lower frame 10b and the central frame 10c having a common transverse side 11b and together constituting an H-shaped frame. The upper transverse side 11a of the frame 10a is adjacent to a transverse return groove 7a. The upper insert 12a and the central insert 12c are separated by a transverse band of foam 19 forming part of the block of foam. The upper frame 10a is thus an inverted U-shaped frame.

In general, the number of permeable inserts in the central part is determined as a function of the desired location of the permeable parts and of the number and of the positions of the return grooves.

Furthermore, each recess is bounded, on at least a portion of its perimeter, by a frame of which at least each shoulder or part separated from at least one peripheral part of the block of foam by at least one lining return groove is made of a hard foam.

As the permeable material for the inserts 12, it is possible to use an entanglement of hair fibres, of animal or vegetable origin, joined together by a synthetic or natural rubber-like material, such as polyurethane or latex. In preference, however, a set of polyester fibres is used, with identical or different denier values, depending on the desired permeability and hardness characteristics, and joined together by a polyurethane coating. A material of this type is known under the brand name "NEOCURL".

Another permeable material usable is a wad of mixed polyester fibres, in which one category of fibres has a high melting point and forms a structure for the wad, while another category of fibres has a lower melting point and acts as a binder for the structural fibres.

In general, the permeable material may be in the form of intermingled fibres of different kinds, for example polyester or copolyester, or with different denier values (large and small diameters), or alternatively balls of polyester joined together by thermoforming.

The padding may be made by implementing one or other of three types of processes.

According to a first type, all the foam parts of the padding are, on the one hand, moulded in one and the same mould, by foaming techniques currently used for making foam with variable hardness and density. On the other hand, the insert is made in its final form by shaping the permeable material, then the insert is assembled in the corresponding recess on the central part of the block of foam of the padding. The permeable material constituting the insert may either be cut beforehand to its final size or brought to its final shape by hot-air thermoforming, if it is, for example, essentially made of polyester.

According to a second type of process, the permeable material is shaped, for example by thermo-forming, in a mould, and then it is overmoulded in a hard polyurethane foam support constituting the base 9 of the recess and the frame 10, so as to obtain a panel as represented in FIG. 11. The peripheral parts of the padding are moulded separately in a single block of foam. The prefabricated panel is then added onto the block of foam and it is bonded to the latter by adhesive or by any other assembly means used in upholstery, as described hereinbelow with reference to FIGS. 12 and 13.

FIG. 11 represents a central part 1 arranged in a two-layer laminate panel, the lower level of which is the foam base 9 of the recess 8 housing the upper layer which consists of the insert 12 of permeable material, surrounded by the frame 10 with three or four sides 11.

The insert 12 is thus mounted as a panel in a support made of a single piece of polyurethane foam and consisting of the base 9 and of the frame 10.

This panel may be prefabricated then added on and fastened in a block of polyurethane foam forming the other foam parts of the padding, as described in more detail hereinbelow with reference to FIGS. 12 and 13.

As represented in FIG. 12, the panel consisting of the insert 12, the base 9 and the frame 10 may be adhesively bonded between the wings 2 of the block of foam by their parts in contact, that is to say the peripheral part of the frame 10 which is adjacent to the base 9, against the opposing part of the wings 2, by the adhesive bonds 17, so as to leave the return grooves 6 existing between the frame 10 and the wings 2 above the adhesive bonds 17.

As a variant, as represented in FIG. 13, a piece of fabric 18, for example a nonwoven fabric covering all or part of the rear face of the padding, may be over-moulded below the base 9 of the panel and adhesively bonded below the wings 2, or overmoulded below the wings 2 and adhesively bonded below the base 9 of the panel, on assembly.

The insert 12 may also be assembled in its housing on its support 9–10 by adhesive bonding, or any other known assembly means which is used in the field of seat upholstery, for example using return pieces or tabs with microhooks engaging with tabs having microloops.

In these two types of processes, the permeable insert 12 may be adhesively bonded simultaneously on the cover, during the thermoforming operation, which economises an assembly operation. This adhesive bonding is obtained either by fusing binding fibres of the permeable material, or by coating the permeable material or the cover with a thermally fusible binder, for example in powder form.

The third type of process has two variants. According to a first possibility, the insert 12 of permeable material is prepared, as mentioned hereinabove, for example by thermoforming, with or without a cover. This insert is then arranged in a mould for casting the padding, where it will be overmoulded during the foaming of the block of variable-density foam constituting all the foam parts of the padding.

According to a second possibility, all the foam parts are first moulded in one and the same mould in order to obtain a block of variable-density foam, then this block is placed in a mould for thermoforming the permeable material, and this material is directly thermo-formed in the foam in order to form the insert in its housing, optionally adding the cover thereto.

We claim:

1. A seat padding comprising:
   a foam block having
      a support face,
      an opposite face, and
      a recess provided in said support face;
   a base adjacent said opposite face which closes said recess;
   at least two lining return grooves in said support face with said recess therebetween, said return grooves being substantially symmetrical to each other with respect to a longitudinal vertical mid-plane of the seat padding such that said two lining grooves define two re-entrant lines for a cover used to surround the seat padding;
   two respective partitions which transversely separate respective said grooves from said recess and which are made of a hard foam material, each said partition including a free end distal from said base which is adapted to be engaged by the cover emerging from an associated said lining groove and stretched over said recess; and
   an insert which fills said recess, said insert being made from a material which is more permeable to one of air or moisture than a material of said foam block.

2. A seat padding as claimed in claim 1 and further including:
   a third partition which transversely joins said two partitions so as to form an open U-shaped frame; and
   a third return groove which is adjacent to and outside of said frame and running along said third partition which transversely separates said third return groove from said recess.

3. A seat padding as claimed in claim 1 wherein said two partitions are part of a closed frame; and further including a third return groove adjacent to said closed frame and running along at least a part of said closed frame.

4. A seat padding as claimed in claim 1 wherein said foam block includes several of said recesses which are transversely oriented and located between said two return grooves and said two partitions.

5. A seat padding as claimed in claim 1 wherein one of said insert and said base has a variable thickness in at least one of the transverse and longitudinal directions.

6. A seat padding as claimed in claim 1 wherein said insert includes an overthickness which projects over said partitions before lining with a cover.

7. A seat padding as claimed in claim 1 wherein said base includes at least one opening therein selected from one of (a) a blind opening which opens towards said support face, (b) a blind opening which opens towards said opposite face, and (c) an opening which emerges in both said support face and said opposite face.

8. A seat padding as claimed in claim 1 wherein said foam block includes side parts which are separated from said two partitions by said two return grooves; and wherein said side parts and said base are made of a foam at least substantially as hard as that of said partitions.

9. A seat padding as claimed in claim 1 wherein said foam block is a single molded piece which includes said recess, said return grooves and said partitions; and wherein said insert is prefabricated separate from said foam block so as to be subsequently fastened in said recess.

10. A seat padding as claimed in claim 1 wherein said insert, said base and said partitions are formed as a panel, which said panel is fastened to said foam block.

\* \* \* \* \*